United States Patent
Shafir et al.

(10) Patent No.: US 10,348,606 B2
(45) Date of Patent: Jul. 9, 2019

(54) METHOD AND SYSTEM FOR PROVIDING A PLATFORM FOR TESTING OF PROCESSES OVER SERVER COMMUNICATIONS PROTOCOLS

(71) Applicant: Dell Products L.P., Round Rock, TX (US)

(72) Inventors: Haim Shafir, Petach-Tikva (IL); Jacky Albo, Bat-Yam (IL)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 15/587,877

(22) Filed: May 5, 2017

(65) Prior Publication Data

US 2018/0324077 A1    Nov. 8, 2018

(51) Int. Cl.
| | |
|---|---|
| *G06F 15/173* | (2006.01) |
| *H04L 12/26* | (2006.01) |
| *G06F 11/30* | (2006.01) |
| *H04L 29/08* | (2006.01) |

(52) U.S. Cl.
CPC .............. *H04L 43/50* (2013.01); *G06F 11/30* (2013.01); *H04L 67/1097* (2013.01); *H04L 67/14* (2013.01)

(58) Field of Classification Search
CPC ................................. H04L 43/50; H04L 67/14
See application file for complete search history.

(56) References Cited

U.S. PATENT DOCUMENTS

| | | | | |
|---|---|---|---|---|
| 5,951,697 | A * | 9/1999 | O'Donnell ......... | G06F 11/2242 709/220 |
| 6,891,802 | B1 * | 5/2005 | Hubbard ............. | H04L 41/5038 370/241 |
| 8,788,685 | B1 * | 7/2014 | Boyles ............... | G06F 11/3688 709/217 |
| 9,396,160 | B1 * | 7/2016 | Aithal ................ | G06F 11/3668 |
| 9,436,725 | B1 * | 9/2016 | Aithal ................ | G06F 11/00 |
| 2007/0083630 | A1 * | 4/2007 | Roth ................... | G06F 11/3688 709/223 |
| 2007/0083634 | A1 * | 4/2007 | Roth ................... | G06F 11/3688 709/223 |
| 2007/0083793 | A1 * | 4/2007 | Roth ................... | G06F 11/3414 714/25 |
| 2008/0130639 | A1 * | 6/2008 | Costa-Requena ...... | G06F 8/65 370/389 |
| 2008/0198742 | A1 * | 8/2008 | Kaempfer ............. | H04L 43/50 370/230 |

(Continued)

*Primary Examiner* — Richard G Keehn
*Assistant Examiner* — Wuji Chen
(74) *Attorney, Agent, or Firm* — Pearl Cohen Zedek Latzer Baratz LLP

(57) ABSTRACT

A method and a system for testing of processes over server communications protocols. The method may include the following steps: obtaining metadata relating to servers and shared folders on a system to be tested; obtaining test files to be used in testing said servers of the system to be tested, wherein each test file comprises a scenario to be run and a respective session configuration, wherein the scenario is a list of operations to be executed on said servers on a packet level; testing the system to be tested by executing one or more of the scenarios on said servers, based on the respective session configurations, to yield test results; and analyzing the test results based on the metadata and a predefined logic.

17 Claims, 2 Drawing Sheets

(56) References Cited

U.S. PATENT DOCUMENTS

| | | | | |
|---|---|---|---|---|
| 2009/0132857 A1* | 5/2009 | Tong | .................. | G06F 11/2294 |
| | | | | 714/27 |
| 2009/0199047 A1* | 8/2009 | Vaitheeswaran | .... | G06F 11/3409 |
| | | | | 714/47.2 |
| 2014/0079207 A1* | 3/2014 | Zhakov | ............... | H04M 3/5175 |
| | | | | 379/265.03 |
| 2014/0189134 A1* | 7/2014 | Das | .................... | H04L 67/1097 |
| | | | | 709/227 |
| 2014/0365827 A1* | 12/2014 | Arguelles | ........... | G06F 11/2635 |
| | | | | 714/27 |
| 2016/0105504 A1* | 4/2016 | Vallabhaneni | ...... | H04L 67/1095 |
| | | | | 709/217 |

* cited by examiner

METHOD AND SYSTEM FOR PROVIDING A PLATFORM FOR TESTING OF PROCESSES OVER SERVER COMMUNICATIONS PROTOCOLS

FIELD OF THE INVENTION

The present invention relates generally to the field of software testing, and more particularly to testing of processes over server communications protocols.

BACKGROUND OF THE INVENTION

Prior to setting forth the background of the invention, it may be helpful to set forth definitions of certain terms that will be used hereinafter.

The term "Network-attached storage" or "NAS" as used herein is defined is a file-level computer data storage server connected to a computer network providing data access to a heterogeneous group of clients. NAS is specialized for serving files either by its hardware, software, or configuration. It is often manufactured as a computer appliance—a purpose-built specialized computer. NAS systems are networked appliances which contain one or more storage drives, often arranged into logical, redundant storage containers or RAID.

Network-attached storage removes the responsibility of file serving from other servers on the network. They typically provide access to files using network file sharing protocols such as NFS, SMB/CIFS, or AFP. NAS devices are a convenient method of sharing files among multiple computers. Potential benefits of dedicated network-attached storage, compared to general-purpose servers also serving files, include faster data access, easier administration, and simple configuration.

Some NAS devices are configured to serve end-clients using a variety of file-sharing-protocols such as, for example, SMB1/2/3, NFS3/4/4.1 and FTP, and variety of operating system (OS) types, such as, but not limited to, MS-Windows: Windows XP, Win7, Win8, win10, 2003, 2008, 2012, a variety of Linux OS flavors, UNIX and different Mac OS versions.

The different OSs may implement different sub-versions ("dialects") of the corresponding protocol, and the different clients may make use of different working conventions and work flows while communication with the NAS file-server.

In order to test the compatibility of a file-server to a specification or request for comments (RFC) of a file-sharing protocol, it may be required to manipulate client-side features that are implemented by the OS and its underlying drivers. Operations that are being tested involve sending protocol commands on the OS level. The challenge of creating OS-level test scenarios on the packet level is shared by the entire NAS manufacturers' community.

In existing standard client test environments, the test application usually requests the operating system to communicate with the NAS. The operating system uses an internal driver to handle this communication, which uses the protocol's commands and command's field as it sees fit, including (for example) the use of client-side-cache. Therefore, it is a challenge to create and execute test scenarios that involve client-side features, such as scenarios that include commands that implement client-side cache and/or persistent file handles.

Exiting solutions are roughly divided into the following two types: load machines and code libraries.

Load machines such as, for example, the ones provided by Spirent and Load DynamiX, offer some capabilities to construct packet-level scenarios. However, the statistical form of their result reporting is a major drawback. It is impossible to get a deterministic result of the communication (passed or failed) without reviewing the generated packet analyzer (for example, Wireshark). Therefore it is highly irrelevant for regression testing.

Code libraries are tools offering coding implementation of packets, which require testing professionals with programming skills in order to construct relevant scenarios from the packets.

Microsoft test suites and SMB-torture are two different intermediate solutions between the load machines and the code libraries. The Microsoft test suites test a verity of SMB implementations. However, they do not allow modification of the scenarios themselves by the end-user. SMB torture (developed by Samba-team) enables adding new scenarios by using programming abilities.

SUMMARY OF THE INVENTION

In order to address the drawbacks of the prior art, some embodiments of the present invention suggest to provide a testing platform that enables the end-user (tester) to compose test scenarios on the packet level which bypass the operating system. The packet-level scenarios include features that are usually controlled exclusively by the operating system, unlike the known testing methods.

Instead of addressing the OS to handle the communication with the NAS as in standard client test environments, some embodiments of the present invention bypass the operating system by generating the test scenarios on the packet level, thus eliminating the interference of OS/Driver autonomic modules.

Some embodiments of the present invention provide method and a system for testing of processes over server communications protocols. The method may include the following steps: obtaining metadata relating to servers and shared folders on a system to be tested; obtaining test files to be used in testing said servers of the system to be tested, wherein each test file comprises a scenario to be run and a respective session configuration, wherein the scenario is a list of operations to be executed on said servers on a packet level; testing the system to be tested by executing one or more of the scenarios on said servers, based on the respective session configurations, to yield test results; and analyzing the test results based on the metadata and a predefined logic.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
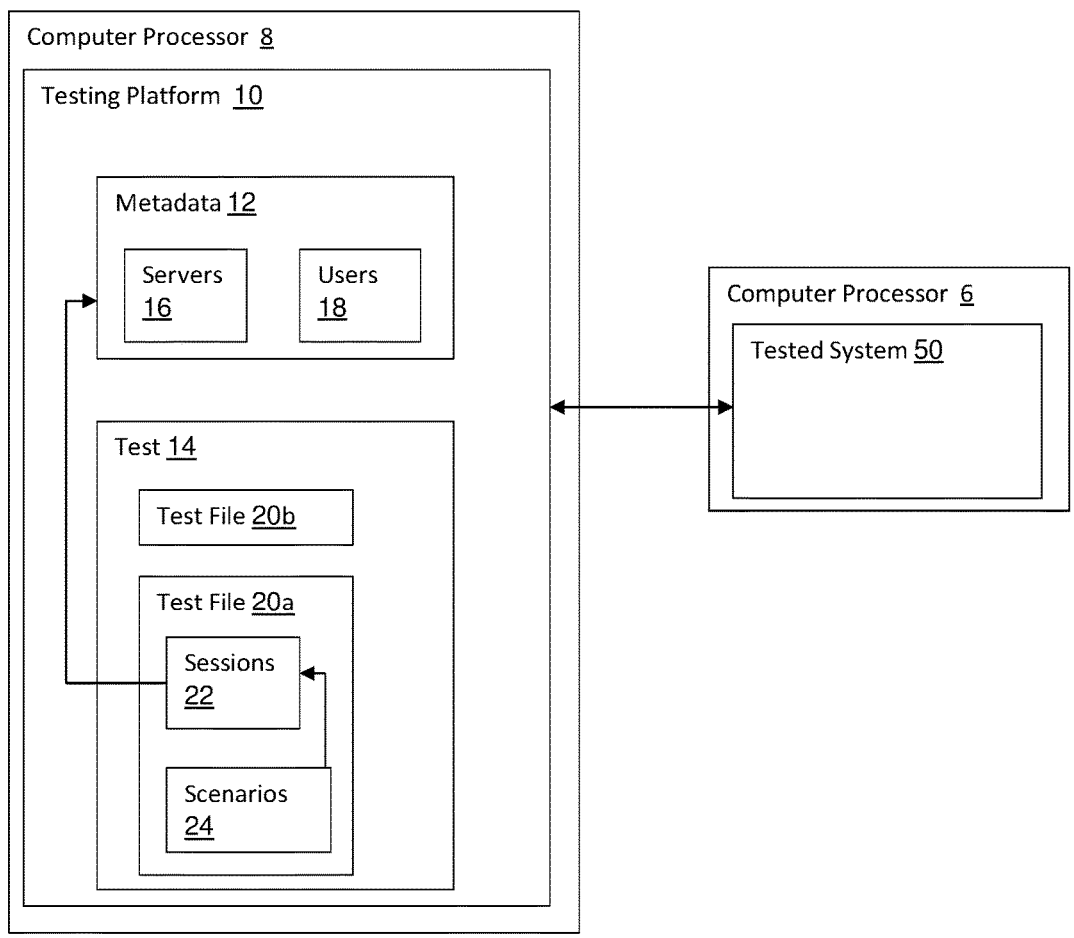
FIG. 1 is a block diagram illustrating non-limiting exemplary architecture of a system in accordance with embodiments of the present invention.

It will be appreciated that for simplicity and clarity of illustration, elements shown in the figures have not necessarily been drawn to scale. For example, the dimensions of

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In order to address the drawbacks of the prior art, some embodiments of the present invention suggest to provide a testing platform that enables the end-user (tester) to compose test scenarios on the packet level which bypass the operating system. The packet-level scenarios include features that are usually controlled exclusively by the operating system, unlike the known testing methods.

Instead of addressing the OS to handle the communication with the NAS as in standard client test environments, some embodiments of the present invention bypass the operating system by generating the test scenarios on the packet level, thus eliminating the interference of OS/Driver autonomic modules.

Consequently, the testing platform according to some embodiments of the present invention, allows constructing interoperable test scenarios—meaning—scenarios that imitate two clients of a different OS which interact on the packet level. An example for this is a scenario that starts with an SMB client performing a byte-range-lock operation over a file and then testing a second client which uses NFS and trying to access the same file's locked segment.

Additionally, the testing platform according to some embodiments of the present invention enables defining test scenarios using Java Script Object Notation (JSON) scenario files, thus avoiding the need for programming knowledge. The testing platform, according to some embodiments of the present invention, provides deterministic results (such as, for example, passed/failed) of the scenarios, thus enables quick regression.

Therefore, the testing platform according to some embodiments of the present invention provides high-resolution test scenarios with accessibility to an end-user which holds no programming skills. In addition it allows flow-control and test regress-ability.

Furthermore, the testing platform according to some embodiments of the present invention allows testing of SMB3 Replay and SMB2 Leases features in multiple sessions.

FIG. 1 is a block diagram illustrating a non-limiting exemplary architecture of a system in accordance with embodiments of the present invention. Testing platform 10, possibly implemented as a software module running over a computer processor 8, includes metadata module 12 and test module 14. Metadata module 12 includes, among other data, information about the server(s) being tested on tested system 50 and about shared folder(s). Test module 14 may include a folder of test files 20a, 20b, and the like.

Metadata module 12 may include general data that will be used by various tests. In some embodiments, a default configuration metadata file for use by various tests by default may be located on the main program directory of testing platform 10. Metadata module 12 may include servers data module 16 and users data module 18. Servers data module 16 may include a list of servers to be used by the scenario section of the test file, and for each server the server name and/or IP and a list of one or more shared folder(s) introduced by the server. Additionally, users data module 18 may include the list of users including the user name, domain and password.

According to some embodiments of the present invention, test files 20a, 20b may each include some kind of experiment to be performed, such as, for example, an experiment of a sub-feature or a bug fix or any other suitable test. Test files 20a, 20b may be JSON formatted files that may include the author name, general description and two main parts: sessions configuration part 22, and a scenario 24 to be run.

According to some embodiments of the present invention, each session configuration file 22 may include keys, representing the session parameters, and their values. The parameters values may be stored on metadata module 12 and configuration file 22 may refer to metadata module 12 to extract the required values. The session parameters may include, for example, host, user, dialect, share tree connections parameters, and the like.

According to some embodiments of the present invention, scenario 24 may include a scenario description and a list of one or more commands, e.g. steps to be run against a tested system 50, possibly implemented as a software module running over computer processor 6. Additionally, scenario 24 may include session keys identifications that may provide reference to respective session parameters values of session 22.

According to some embodiments of the present invention, scenario 24 may be executed by entering testing platform 10 a path to the directory of one or more test files (such as files 20a, 20b) to be run and, optionally, a location of a configuration metadata file. Further, optionally, a "stop on fail" execution mode may be entered as an execution parameter for stopping the test process in case the scenario fails.

According to some embodiments of the present invention, during operation, the scenario included in the test file runs by performing the steps of the scenario. According to the requirements of each step, the testing platform retrieves details about user(s), server(s), expected replies and/or other session parameters, for example from the metadata module, and performs the indicated step by sending a request to the tested system. Then, the results of the request are being checked against expected results and reply logic. In case the platform fails to perform the step, i.e. the result does not match the expected result, the scenario ends with a failure. For example, a step may include a connection with a server, or a shared connection, or file creation or a certain another request. In case, for example, a connection is failed or the reply received from the tested system is not the expected reply, the scenario ends with a failure.

For example, a scenario according to some embodiments of the present invention, may include oplocks and/or leases operations, in which a step may include telling a server that the client cached certain files. The testing platform may retrieve the required details from the metadata module as discussed above, including the expected replies.

In another, if a step includes other clients trying to access these files, the NAS would first attempt to notify the original client that its cache should be written to the NAS before replying the second client, and the expected replay to the second client should reflect this server behavior.

In yet another example, a scenario may include durability and/or persistency operations, in which a step may include telling the server that the client would like to reconnect to the files in case of network disconnections. The NAS should hold the file handles valid for reconnections under different circumstances, and the expected replay should match this rule.

Such scenarios are enabled by the testing platform of present invention and are not possible to simulate in usual test systems, because the client-side cache and the persistent file handles are OS autonomic features which involve OS communication with NAS, for example on SMB2 and SMB3 protocols.

Figure 2:
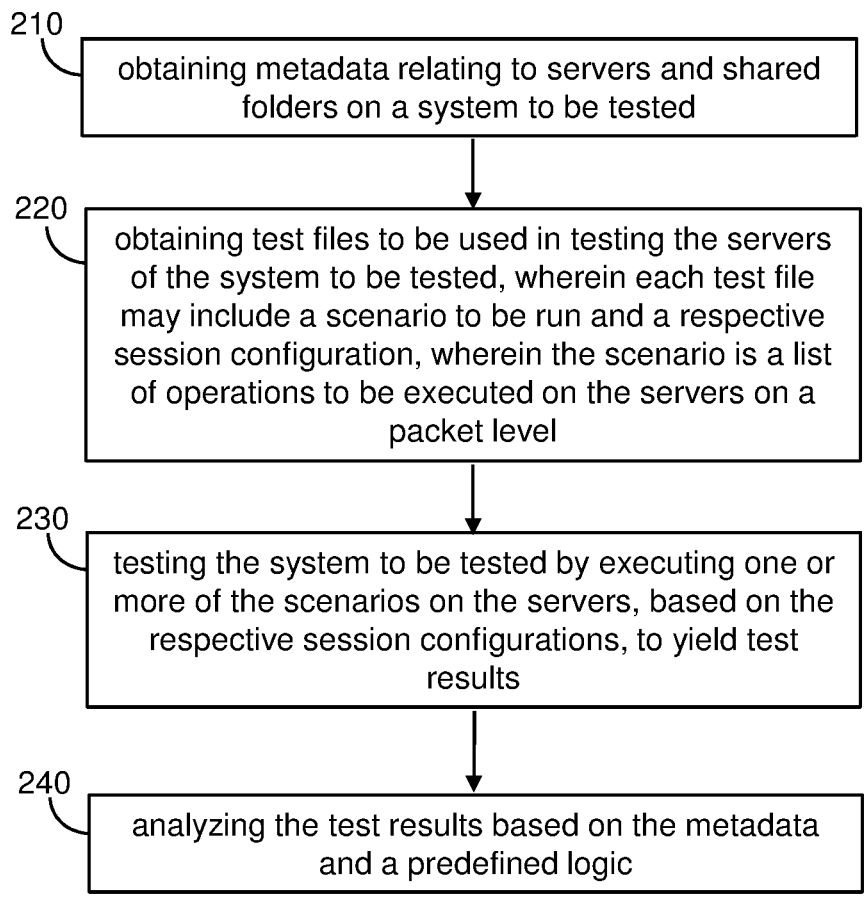
FIG. 2 is a flowchart illustrating a method in accordance with embodiments of the present invention.

FIG. 2 is a flowchart 200 illustrating a method for testing of processes over server communications protocols, in accordance with embodiments of the present invention. Method 200 may include the following steps: obtaining metadata relating to servers and shared folders on a system to be tested 210; obtaining test files to be used in testing the servers of the system to be tested, wherein each test file may include a scenario to be run and a respective session configuration, wherein the scenario is a list of operations to be executed on the servers on a packet level 220; testing the system to be tested by executing one or more of the scenarios on the servers, based on the respective session configurations, to yield test results 230; and analyzing the test results based on the metadata and a predefined logic 240.

In order to implement method 200 according to some embodiments of the present invention, a computer processor may receive instructions and data from a read-only memory or a random access memory or both. At least one of aforementioned steps of method 200 may be performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for testing of processes over server communications protocols, the method comprising:
   obtaining metadata relating to servers and shared folders on a system to be tested;
   obtaining test files to be used in testing said servers of the system to be tested, wherein each test file comprises a scenario to be run and a respective session configuration, wherein the scenario is a list of operations to be executed on said servers on a packet level;
   testing the system to be tested by executing one or more of the scenarios on said servers, based on the respective session configurations, to yield test results; and analyzing the test results based on the metadata and a predefined logic, wherein said metadata comprises servers data being a list of servers to be used by the scenario and for each server the server name and/or IP and a list of one or more shared folders introduced by the server.

2. The method according to claim 1, wherein said metadata further comprises users data being a list of users including the user name, domain and password.

3. The method according to claim 1, wherein said session configuration comprise keys, representing session parameters, and respective values.

4. The method according to claim 3, wherein said session parameters include at least one of: host, user, dialect, share tree connections parameters.

5. The method according to claim 1, wherein the scenario comprises session keys identifications providing reference to respective session parameters values of session.

6. The method according to claim 1, wherein the scenario is executed, in a "stop on fail" execution mode by entering an execution parameter for stopping the test process in case that the scenario fails.

7. A system for testing of processes over server communications protocols, the system comprising:
 a metadata module implemented by a computer processor and configured to obtain metadata relating to servers and shared folders on a system to be tested;
 a test module implemented by a computer processor and configured to obtain test files to be used in testing said servers of the system to be tested, wherein each test file comprises a scenario to be run and a respective session configuration, wherein the scenario is a list of operations to be executed on said servers on a packet level; and
 a testing platform implemented by a computer processor and configured to:
  test the system to be tested by executing one or more of the scenarios on said servers, based on the respective session configurations, to yield test results; and
  analyze the test results based on the metadata and a predefined logic,
 wherein said metadata comprises servers data being a list of servers to be used by the scenario and for each server the server name and/or IP and a list of one or more shared folders introduced by the server.

8. The system according to claim 7, wherein said metadata further comprises users data being a list of users including the user name, domain and password.

9. The system according to claim 7, wherein said session configuration comprise keys, representing session parameters, and respective values.

10. The system according to claim 9, wherein said session parameters include at least one of: host, user, dialect, share tree connections parameters.

11. The system according to claim 7, wherein the scenario comprises session keys identifications providing reference to respective session parameters values of session.

12. The system according to claim 7, wherein the scenario is executed, in a "stop on fail" execution mode by entering an execution parameter for stopping the test process in case that the scenario fails.

13. A non-transitory computer readable medium for testing of processes over server communications protocols, the computer readable medium comprising a set of instructions that when executed cause at least one computer processor to:
 obtain metadata relating to servers and shared folders on a system to be tested;
 obtain test files to be used in testing said servers of the system to be tested, wherein each test file comprises a scenario to be run and a respective session configuration, wherein the scenario is a list of operations to be executed on said servers on a packet level;
 test the system to be tested by executing one or more of the scenarios on said servers, based on the respective session configurations, to yield test results; and
 analyze the test results based on the metadata and a predefined logic,
 wherein said metadata comprises servers data being a list of servers to be used by the scenario and for each server the server name and/or IP and a list of one or more shared folders introduced by the server.

14. The non-transitory computer readable medium according to claim 13, wherein said metadata further comprises users data being a list of users including the user name, domain and password.

15. The non-transitory computer readable medium according to claim 13, wherein said session configuration comprise keys, representing session parameters, and respective values.

16. The non-transitory computer readable medium according to claim 15, wherein said session parameters include at least one of: host, user, dialect, share tree connections parameters.

17. The non-transitory computer readable medium according to claim 13, wherein the scenario comprises session keys identifications providing reference to respective session parameters values of session.

* * * * *